US011317445B2

(12) United States Patent
Fan et al.

(10) Patent No.: US 11,317,445 B2
(45) Date of Patent: Apr. 26, 2022

(54) TRANSMISSION OF COMMUNICATION SIGNALS ASSOCIATED WITH DIFFERENT LISTEN-BEFORE-TALK TIME PERIODS

(71) Applicant: QUALCOMM Incorporated, San Diego, CA (US)

(72) Inventors: Zhifei Fan, San Diego, CA (US); Xiaoxia Zhang, San Diego, CA (US); Tao Luo, San Diego, CA (US); Arumugam Chendamarai Kannan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/737,293

(22) Filed: Jan. 8, 2020

(65) Prior Publication Data

US 2020/0229239 A1    Jul. 16, 2020

Related U.S. Application Data

(60) Provisional application No. 62/792,733, filed on Jan. 15, 2019.

(51) Int. Cl.
*H04W 74/08* (2009.01)
*H04W 72/12* (2009.01)
(Continued)

(52) U.S. Cl.
CPC ....... *H04W 74/0833* (2013.01); *H04L 5/0055* (2013.01); *H04W 72/042* (2013.01); *H04W 72/1247* (2013.01); *H04W 72/1284* (2013.01)

(58) Field of Classification Search
None
See application file for complete search history.

(56) References Cited

U.S. PATENT DOCUMENTS 10,805,945 B2 * 10/2020 Kim ................. H04W 72/1268
10,993,260 B2 *  4/2021 Siomina ........... H04W 72/1273
(Continued)

FOREIGN PATENT DOCUMENTS

EP    3410808 A1    12/2018

OTHER PUBLICATIONS

HTC: "Discussion on Overlapping of LBT Procedures", 3GPP Draft, 3GPP TSG-RAN WG1 #86, R1-167731, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051126062, pp. 1-2, Retrieved from the Internet: URL: http://www.3gpp.org/ftp/Meetings_3GPP_SYNC/RAN1/Docs/, [retrieved on Aug. 21, 2016], Section 2.
(Continued)

*Primary Examiner* — Ayaz R Sheikh
*Assistant Examiner* — Faiyazkhan Ghafoerkhan
(74) *Attorney, Agent, or Firm* — Liem T. Do

(57) ABSTRACT

Wireless communications systems and methods related to transmitting communication signals are provided. A first wireless communication device performs a first LBT during a first time period for transmitting a first communication signal associated with a first priority. The first wireless communication device performs a second LBT during a second time period for transmitting a second communication signal associated with a second priority, wherein the first time period is at least partially overlapping with the second time period, and wherein the first priority is different from the second priority. The first wireless communication device communicates with a second wireless communication device, at least one of the first communication signal or the second communication signal based on at least one of the first LBT or the second LBT.

30 Claims, 8 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2016/0242213 A1* | 8/2016 | Dabeer | H04W 74/0833 |
| 2017/0331577 A1* | 11/2017 | Parkvall | H04L 5/0053 |
| 2017/0331670 A1* | 11/2017 | Parkvall | H04J 11/0079 |
| 2017/0339721 A1* | 11/2017 | Mukherjee | H04W 74/0816 |
| 2018/0199369 A1* | 7/2018 | Larsson | H04W 74/0808 |
| 2018/0242317 A1* | 8/2018 | Marinier | H04W 72/0446 |
| 2019/0007181 A1* | 1/2019 | Marinier | H04L 5/0007 |
| 2019/0014548 A1* | 1/2019 | Pelletier | H04W 52/246 |
| 2019/0082398 A1* | 3/2019 | Loehr | H04W 52/365 |
| 2019/0082399 A1* | 3/2019 | Loehr | H04W 72/14 |
| 2019/0098585 A1* | 3/2019 | Golitschek Edler Von Elbwart | H04W 52/04 |
| 2019/0104477 A1* | 4/2019 | MolavianJazi | H04W 52/08 |
| 2019/0104498 A1* | 4/2019 | Jung | H04W 72/042 |
| 2019/0110307 A1* | 4/2019 | Kim | H04W 74/0808 |
| 2019/0141643 A1* | 5/2019 | MolavianJazi | H04B 7/0695 |
| 2019/0150176 A1* | 5/2019 | Pelletier | H04W 72/0453 370/329 |
| 2019/0150198 A1* | 5/2019 | Sun | H04L 5/0048 370/329 |
| 2019/0159135 A1* | 5/2019 | MolavianJazi | H04W 52/362 |
| 2019/0159136 A1* | 5/2019 | MolavianJazi | H04W 52/146 |
| 2019/0230706 A1* | 7/2019 | Li | H04W 88/08 |
| 2019/0335337 A1* | 10/2019 | Damnjanovic | H04W 16/14 |
| 2020/0154475 A1* | 5/2020 | Pao | H04W 74/0808 |

OTHER PUBLICATIONS

Huawei, et al., "DL LBT Priority Classes", 3GPP Draft, 3GPP TSg-RAN WG2 Meeting #92, R2-156217, 3rd Generation Partnership Project (3GPP), Mobile Competence Centre, 650, Route Des Lucioles, F-06921 Sophia-Antipolis Cedex, France, vol. RAN WG2, No. Anaheim, USA, Nov. 16, 2015-Nov. 20, 2015, Nov. 16, 2015 (Nov. 16, 2015), XP051005731, 6 Pages, Retrieved from the Internet: URL: http://www.3gpp.org/ftp/Meetings_3GPP_SYNC/RAN2/Docs/, [retrieved on Nov. 16, 2015], Section 2.
International Search Report and Written Opinion—PCT/US2020/012948—ISA/EPO—dated Mar. 31, 2020.

* cited by examiner

TRANSMISSION OF COMMUNICATION SIGNALS ASSOCIATED WITH DIFFERENT LISTEN-BEFORE-TALK TIME PERIODS

CROSS REFERENCE TO RELATED APPLICATIONS & PRIORITY CLAIM

The present application claims priority to and the benefit of the U.S. Provisional Patent Application No. 62/792,733 filed Jan. 15, 2019, which is hereby incorporated by reference in its entirety.

TECHNICAL FIELD

This application relates to wireless communication systems, and more particularly to communicating communication signals associated with different priorities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes performing, by a first wireless communication device, a first LBT during a first time period for transmitting a first communication signal associated with a first priority; performing, by the first wireless communication device, a second LBT during a second time period for transmitting a second communication signal associated with a second priority, where the first time period is at least partially overlapping with the second time period, and where the first priority is different from the second priority; and transmitting, by the first wireless communication device with a second wireless communication device, at least one of the first communication signal or the second communication signal based on at least one of the first LBT or the second LBT.

In an additional aspect of the disclosure, an apparatus includes a processor configured to perform a first LBT during a first time period for transmitting a first communication signal associated with a first priority; and perform a second LBT during a second time period for transmitting a second communication signal associated with a second priority, where the first time period is at least partially overlapping with the second time period, and where the first priority is different from the second priority. The apparatus further includes a transceiver configured to transmit at least one of the first communication signal or the second communication signal based on at least one of the first LBT or the second LBT.

In an additional aspect of the disclosure, for a computer-readable medium having program code recorded thereon, the program code includes code for causing a first wireless communication device to perform a first LBT during a first time period for transmitting a first communication signal associated with a first priority; code for causing the first wireless communication device to perform a second LBT during a second time period for transmitting a second communication signal associated with a second priority, where the first time period is at least partially overlapping with the second time period, and where the first priority is different from the second priority; and code for causing the first wireless communication device to transmit at least one of the first communication signal or the second communication signal based on at least one of the first LBT or the second LBT.

In an additional aspect of the disclosure, an apparatus includes means for performing a first LBT during a first time period for transmitting a first communication signal associated with a first priority; means for performing a second LBT during a second time period for transmitting a second communication signal associated with a second priority, where the first time period is at least partially overlapping with the second time period, and where the first priority is different from the second priority; and means for transmitting at least one of the first communication signal or the second communication signal based on at least one of the first LBT or the second LBT.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
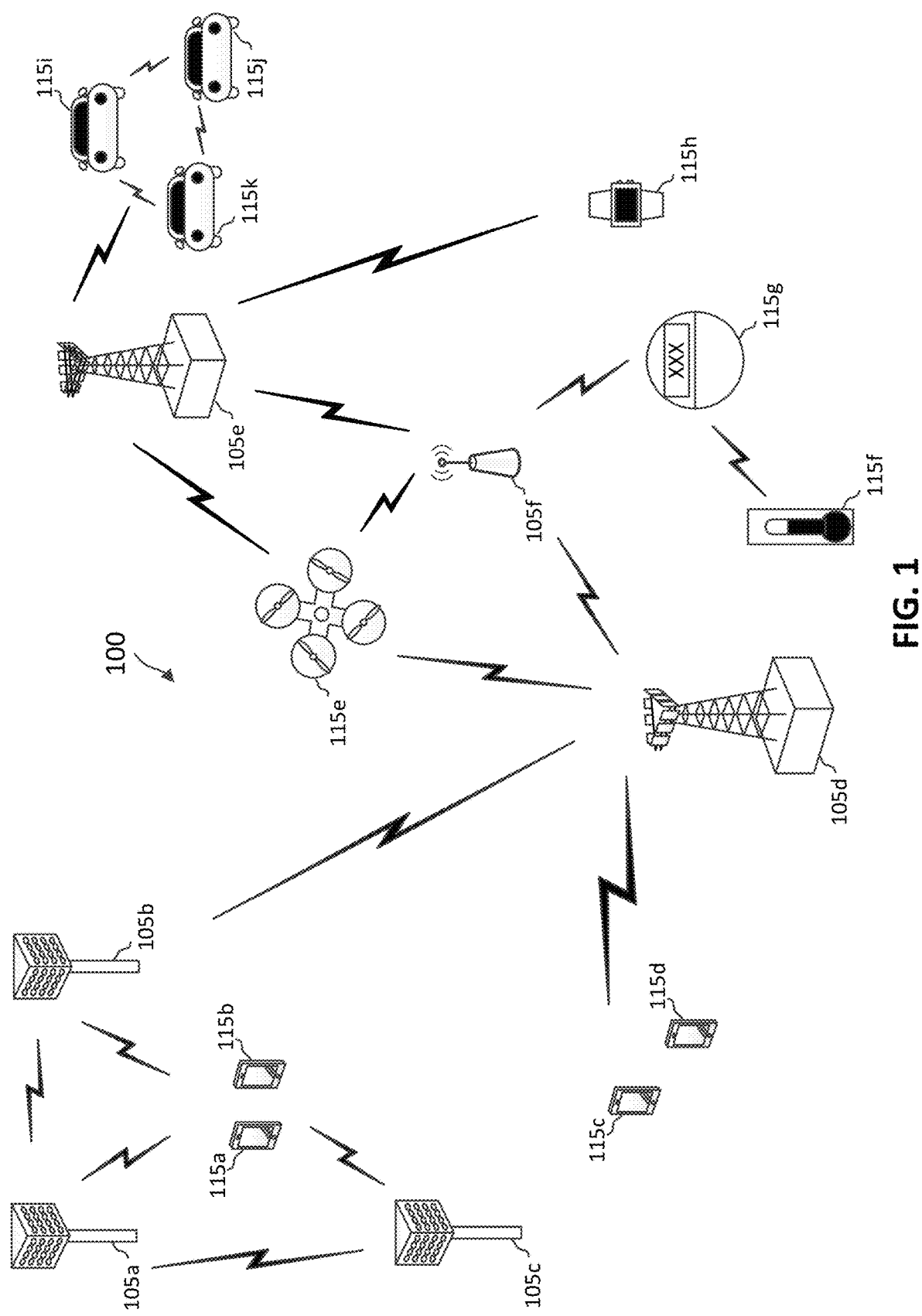
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may includes at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with the small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. AN UL-centric subframe may include a longer duration for UL communication than for DL communication.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit an UL communication signal to the BS 105 via a physical UL shared channel (PUSCH) and/or physical UL control channel (PUCCH) according to an UL scheduling grant.

In an embodiment, the network 100 may be an NR network deployed over a licensed spectrum. The network 100 may operate over a shared channel, which may include shared frequency bands or unlicensed frequency bands, for example, at about 3.5 gigahertz (GHz), sub-6 GHz or higher frequencies in the mmWav band. In such an embodiment, a wireless communication device may share resources in the shared communication medium and may employ a listen-before-talk (LBT) procedure to reserve transmission opportunities (TXOPs) in the shared medium for communications. TXOPs may be non-continuous in time and may refer to an amount of time a station can send frames when it has won contention for the wireless medium. Each TXOP may include a plurality of slots and one or more medium sensing periods.

A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. In an example, the wireless communication device is the BS 105. When the LBT results in an LBT pass, the BS 105 may schedule a UE 115 for communications over the shared channel during the TXOP. In another example, the BS 105 may transmit to the UE 115, DL data and/or time domain resource location information regarding a transmission of a feedback for the DL data.

In another example, the wireless communication device is the UE 115. When the LBT results in an LBT pass, the UE 115 may receive from the BS 105, DL data and/or time domain resource location information regarding the feedback for the DL data and/or may transmit UL data to the BS. The UE 115 may receive the DL data from the BS 105 and transmit feedback for the DL data to the BS 105. The feedback may be an acknowledgement (ACK) indicating that reception of the DL data by the UE is successful (e.g., received the DL data without error) or may be a negative-acknowledgement (NACK) indicating that reception of the DL data by the UE is unsuccessful (e.g., including an error or failing an error correction). The transmission of UL data by the UE is subject to LBT.

An LBT mode may be, for example, a category 4 LBT, category 2 LBT, or "no LBT". A category 2 LBT refers to an LBT without a random backoff period. A category 4 LBT refers to an LBT with a random backoff and a variable contention window (CW). A "no LBT" mode allows a wireless communication device priority to transmit on the channel without sensing whether another entity is using the channel.

The present disclosure provides techniques for transmitting one or more communication signals. In some examples, the BS 105 reserves a TXOP and during the TXOP, transmits DL data according to a DL grant to the UE 115. The BS 105 may also indicate an UL grant to the UE 115 via a PDCCH. The UE 115 may receive the DL grant and the indication of the UL grant. Prior to transmitting a feedback for the DL data, the UE 115 may perform an LBT. If the UE 115 can transmit the feedback during the TXOP reserved by the BS 105, the UE 115 may perform a category 2 LBT. If the category 2 LBT results in a LBT pass, the UE 115 may transmit during the TXOP, the feedback. Alternatively, if the UE 115 can transmit the feedback during the TXOP reserved by the BS 105 and a link-switch gap between the DL and the UL satisfies a threshold, the UE 115 may perform "no LBT." In this example, the UE 115 may transmit during the TXOP, the feedback without sensing whether another entity is using the channel.

If the UE 115 is unable to transmit the feedback during the TXOP reserved by the BS 105, the UE 115 may perform a category 4 LBT prior to transmitting the feedback. Additionally, if the UL data according to the UL grant is scheduled for transmission after the transmission of the feedback associated with the DL data, the UE 115 may also perform a category 4 LBT prior to transmitting the UL data. In some examples, the UE 115 may perform a first LBT during a first time period for transmitting the feedback (e.g., PUCCH) associated with a first priority and perform a second LBT during a second time period for transmitting the UL data (e.g., PUSCH) associated with a second priority. The UE 115 may perform the first and second LBTs such that the first time period at least partially overlaps with the second time period rather than perform the first and second LBTs sequentially (one after the other). The first priority is different from the second priority. Doing so may improve spectrum sharing performance and reduce LBT latency.

The UE 115 may transmit to the BS 105, at least one of the first communication signal or the second communication signal based on at least one of the first LBT or the second LBT. For example, if the first and second LBTs pass, the UE 115 may transmit the first and second communication signals. If the first LBT passes, but not the second LBT, the UE 115 may transmit the first communication signal, but not the second communication signal. The UE 115 may perform another LBT for transmitting the second communication signal.

Figure 2:
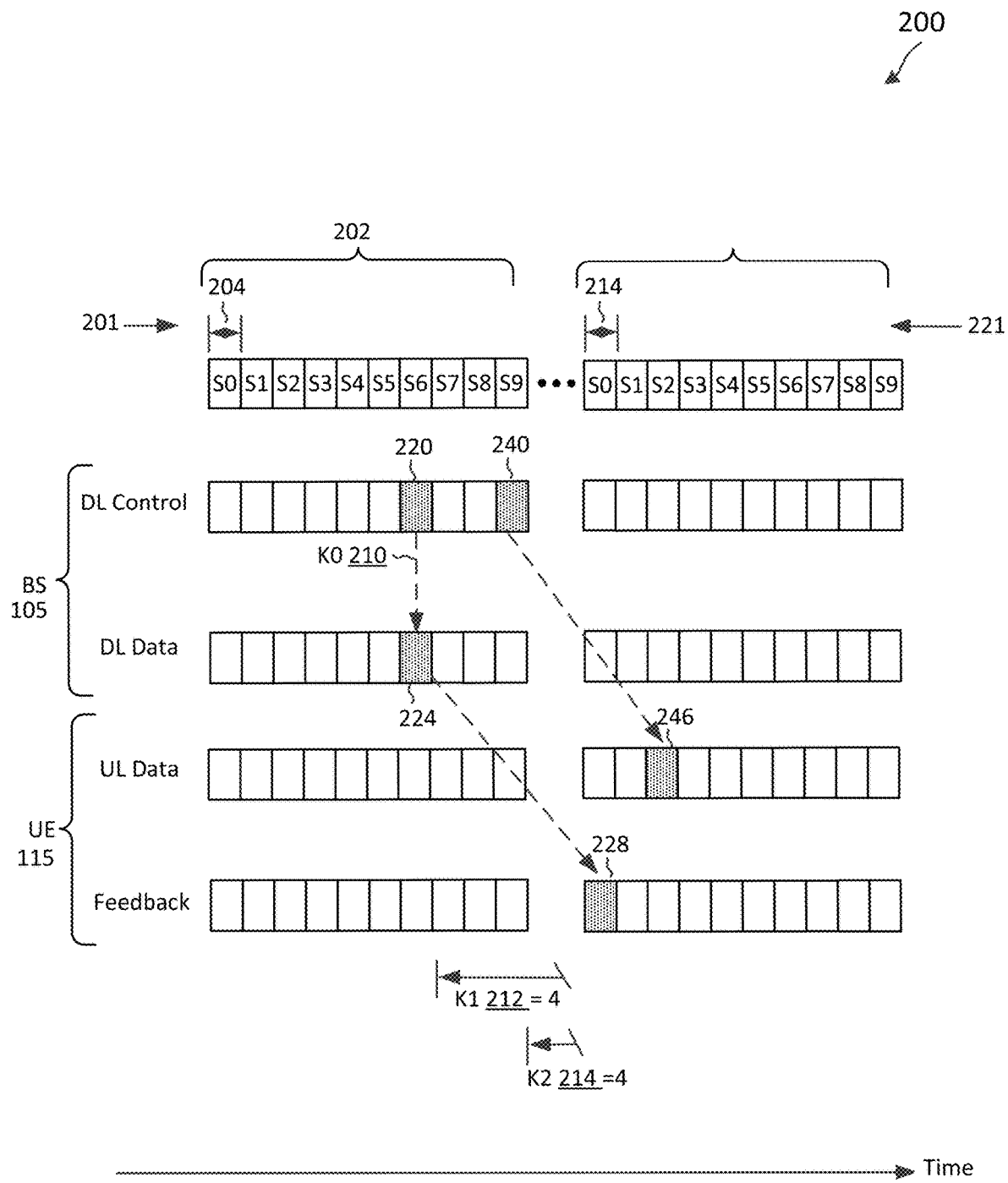
FIG. 2 illustrates a communication scheme for transmitting one or more communication signals based on performing two listen-before-talks (LBTs) according to some embodiments of the present disclosure.

FIG. 2 illustrates a communication scheme 200 for transmitting one or more communication signals based on performing two LBTs according to some embodiments of the present disclosure. The communication scheme 200 may correspond to a scheme communicated between a BS 105 and a UE 115 of the network 100. In FIG. 2, the x-axis represents time in some constant units. FIG. 2 shows a frame structure 201 of a TXOP 202 in a shared channel. The TXOP 202 includes a plurality of slots 204 in time. The TXOP 202 includes ten slots 204 indexed from S0 to S9. The number of slots within a TXOP may vary depending on the embodiments.

A BS may communicate with a UE in units of slots. The slots may also be referred to as TTIs. Each slot or TTI may carry a medium access control (MAC) layer transport block. Each slot may include a number of symbols in time and a number of frequency tones in frequency. Each slot may include a DL control portion followed by at least one of a subsequent DL data portion, UL data portion, and/or an UL control portion. In the context of LTE or NR, the DL control portion, the DL data portion, the UL data portion, and the UL control portion may be referred to as a PDCCH, a PDSCH, a PUSCH, and a PUCCH, respectively.

The BS and the UE may further communicate based on a parameter 210, denoted as K0, a parameter 212, denoted as K1, and a parameter 214, denoted as K2. The parameter 210 indicates a time period between a DL grant and a corresponding DL transmission. The parameter 212 indicates a time period between a DL data reception and a corresponding feedback for the DL data. A feedback signal may correspond to an ACK or a NACK transmission. The UE may transmit an ACK when the reception of the DL data is successful (e.g., received the DL data without error). Alternatively, the UE may transmit a NACK when the reception of the DL data is unsuccessful (e.g., including an error or failing an error correction). The parameter 214 indicates a time period between an UL grant and a corresponding UL data transmission. The parameters 210, 212, and 214 may be pre-configured by the network and may be indicated in units of slots. In the context of LTE or NR, the parameters 210, 212, and 214 may be indicated in a downlink control information (DCI) carried in a PDCCH.

The BSs contending for a TXOP in a shared channel may perform an LBT in the shared channel. If the LBT results in an LBT pass, the BS 105 may reserve a TXOP 202. The TXOP 202 may be referred to as channel occupancy time (COT). The parameter 210 may indicate a value of zero (e.g., K0=0), the parameter 212 may indicate a value of four (e.g., K1=4), and the parameter 214 may indicate a value of four (e.g., K2=4). Although the parameter 210 is shown as indicating a value of zero, it should be understood that the parameter 210 may indicate a value that is greater than zero. Additionally, although each of the parameter 212 and the parameter 214 may be described as having a value of four, it should be understood that each of these parameters may indicate a value that is less than or greater than four. The pattern-filled boxes represent transmissions of DL control information, DL data, UL data, an ACK, and/or an NACK in corresponding slots. While an entire slot is pattern-filled, a transmission may occur only in a corresponding portion of the slot.

The BS 105 may transmit during the TXOP 202, DCI 220 in the slot 204 indexed S6 (e.g., in a DL control portion of the slot 204). The DCI 220 may indicate a DL grant for the UE in the same slot 204 indexed S6 (e.g., K0=0). Thus, the BS transmits a DL data signal 224 to the UE in the slot 204 indexed S6 (e.g., in a DL data portion of the slot 204).

The UE may receive the DCI 220 and receive the DL data signal 224 based on the DL grant. After receiving the DL data signal 224, the UE 115 may report a reception status of the DL data signal 224 to the BS by transmitting an ACK/NACK signal 228 (e.g., in an UL data portion or an UL control portion of a slot) based on the parameter 212 (e.g., K1=4). The ACK/NACK signal 228 refers to a feedback signal carrying an ACK or a NACK. The UE may transmit an ACK when the reception of the DL data signal 224 is successful (e.g., received the DL data without error). Alternatively, the UE may transmit a NACK when the reception of the DL data signal 224 is unsuccessful (e.g., including an error or failing an error correction). The BS 105 may indicate the resource (e.g., slot) that may be used by the UE 115 for providing the feedback. The resource may be provided via a TXOP structure configuration and/or a control channel information detected by the UE 115.

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The UEs contending for a TXOP in a shared channel may perform an LBT in the shared channel. The UE 115's ability to transmit the ACK/NACK signal 228 depends on whether the UE is able to gain access to the medium for transmission and/or reception of data. A TXOP may be, for example, two ms and within the TXOP, multiple UL and DL transmissions may occur to and/or from the UE 115 or other wireless communication devices operating in the shared medium. If the UE 115 is able to reserve a TXOP and can transmit the ACK/NACK signal 228 within the time duration of the TXOP 202 reserved by the BS 105, the UE 115 may do so. In this example, the UE 115 may perform a category 2 LBT before the UL transmission of the ACK/NACK signal 228. If the category 2 LBT results in a LBT pass, the UE 115 may transmit the ACK/NACK signal 228 during the TXOP 202 reserved by the BS 105.

Alternatively, the UE 115 may perform "no LBT" if a gap between the DL transmission (e.g., DL data signal 224) and the UL transmission (e.g., feedback associated with the DL data signal 224) satisfies a predefined threshold. In an example, the UE 115 may perform "no LBT" in the shared channel and may accordingly transmit the ACK/NACK signal 228 in the shared channel if the gap is smaller than the predefined threshold. The predefined threshold may vary. In an example, the predefined threshold may be in units of time (e.g., sixteen microseconds for a Wi-Fi network). In another example, the predefined threshold may be in units of a number of symbols.

If the BS 105 transmits the DL communication (e.g., the DCI 220 and the DL data signal 224) near an end of the TXOP 202, the UE 115 may be unable to transmit the ACK/NACK signal 228 within the time duration of the TXOP 202 reserved by the BS 105. For example, the UE 115 may not have enough time to process the DL data signal 224 and transmit the ACK/NACK signal 228 within this time duration. As shown in the example illustrated in FIG. 2, the BS 105 transmits during the TXOP 202, the DL data signal 224 in the slot 204 indexed S6, with three more slots remaining in the TXOP 202. The parameter 212 may have a value of four and indicates that the UE 115 is unable to transmit the ACK/NACK signal 228 within the time duration of the TXOP 202. In this example, the UE 115 may perform a category 4 LBT in unlicensed spectrum.

Additionally, the BS 105 transmits DCI 240 in the slot 204 indexed S9 (e.g., in a DL control portion of the slot 204), with zero slots remaining in the TXOP 202. The UE 115 receives the DCI 240, which may indicate an UL grant for the UE 115. The UE 115 transmits an UL data signal 246 to the BS 105 (e.g., in an UL data portion of the slot 214) based on the UL assignment and the parameter 214 (e.g., K2=4). The parameter 214 may have a value of four and indicates that the UE 115 is unable to transmit the ACK/NACK signal 228 within the time duration of the TXOP 202 reserved by the BS 105. Additionally, the transmission of the UL data signal 246 may be scheduled after the transmission of the ACK/NACK signal 228. If transmission of the ACK/NACK signal 228 falls outside of the TXOP 202 reserved by the BS 105, the UE 115 may be unable to transmit the UL data signal 246 within the time duration of the TXOP 202. Accordingly, the UE 115 may transmit the UL data signal 246 outside of the TXOP 202 reserved by the BS 105. In this example, the UE 115 may perform a category 4 LBT in the unlicensed spectrum prior to the slot 214 indexed S2. If the LBT results in an LBT pass, the UE 115 may transmit the UL data signal 246 in a slot 214 indexed S2.

As can be observed, a BS may indicate scheduling information using relative timing (e.g., an offset time period relative to a current time period in which the scheduling information is communicated). Further, although the DL grant for the DL data signal 224 indicated by the DCI 220 and the UL grant indicated by the DCI 240 are shown as being indicated by different DCIs, it should be understood that the DL grant for the DL data signal 224 and the UL grant may be indicated by the same DCI (e.g., DCI 220). Furthermore, although the DCI 220 is shown as being transmitted before the DCI 240, it should be understood that the DCI 220 may be transmitted after the DCI 240. In this example, the ACK/NACK signal 228 may still be scheduled for transmission before the UL data signal 246.

The present disclosure provides techniques for transmitting communication signals. In an example, the UE 115 is unable to transmit the feedback associated with a DL data signal within a TXOP or COT reserved by the BS 105. If the UE 115 is scheduled to transmit an UL data signal after the feedback transmission, the time period during which the UE 115 performs a first LBT for the feedback transmission and a second LBT for the UL data signal transmission may overlap. In this way, spectrum sharing performance may improve and LBT latency may be reduced.

Figure 3:
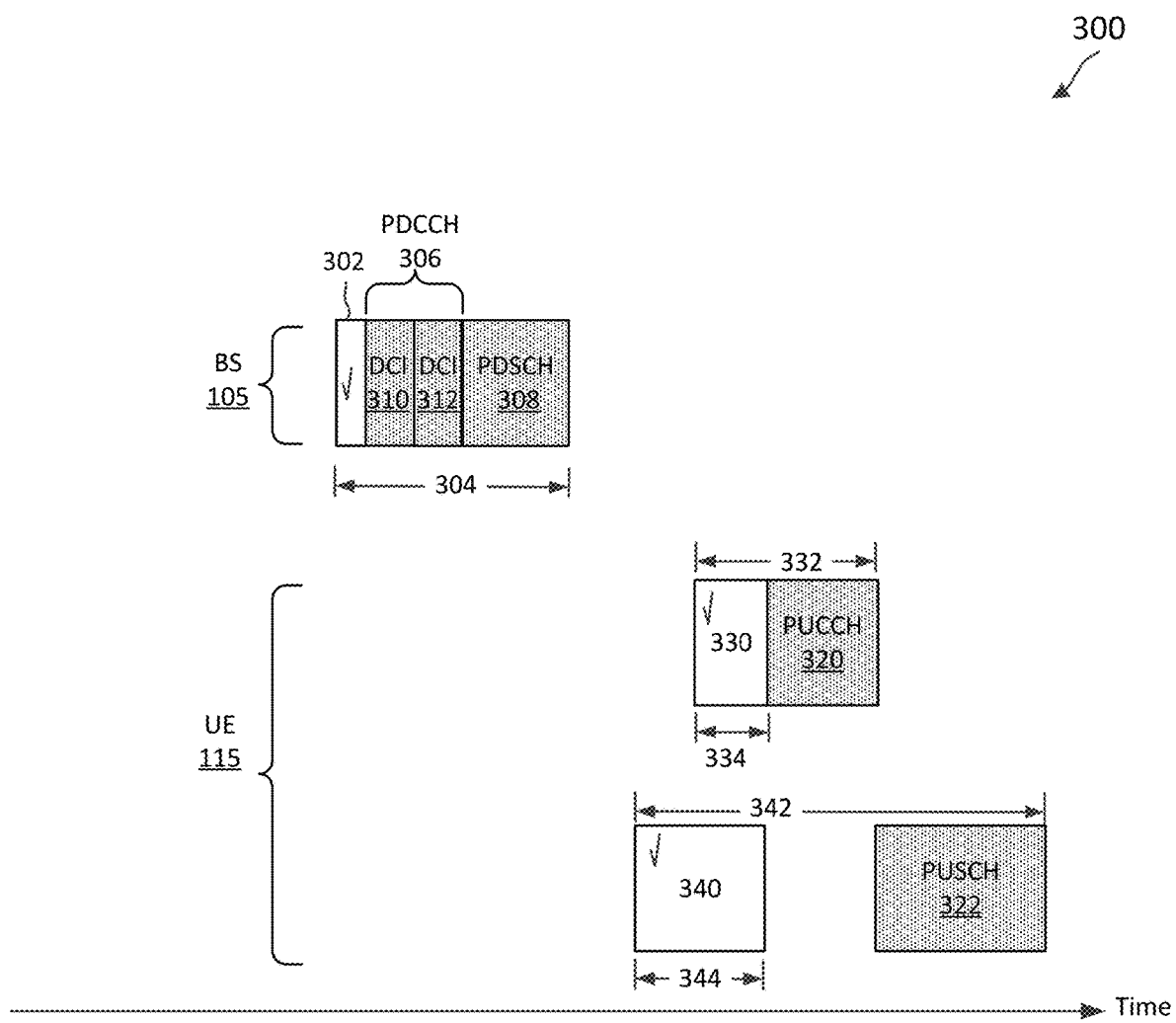
FIG. 3 illustrates a communication scheme for transmitting one or more communication signals based on two LBTs according to some embodiments of the present disclosure.

FIG. 3 illustrates a communication scheme 300 for transmitting one or more communication signals based on performing two LBTs according to some embodiments of the present disclosure. The communication scheme 300 may be employed by UEs such as the UEs 115 and by BSs such as BSs 105 in a network such as the network 100. In FIG. 3, the BS 105 may perform an LBT 302 to reserve a TXOP 304 for a DL transmission in a PDCCH 306 and a PDSCH 308 to the UE 115. A check mark shown in an LBT indicates an LBT pass, and an "X" shown in an LBT indicates an LBT fail. The checkmark shown in the LBT 302 indicates that the LBT 302 results in an LBT pass. Accordingly, the BS 105 transmits during the TXOP 304, the PDCCH 306 and the PDSCH 308 to the UE 115. The PDCCH 306 and the PDSCH 308 may be transmitted in the same or different slots of the TXOP 304.

The UE 115 may receive the PDCCH 306 and the PDSCH 308 from the BS 105. The PDCCH 306 may include a DCI 310 and a DCI 312. The DCI 310 may indicate a DL grant, and the BS 105 may transmit in the PDSCH 308 to the UE 115 according to the DL grant. The UE 115 may receive the DCI 310 indicating the DL grant and desire to transmit a feedback associated with the PDSCH 308 via a PUCCH 320 to the BS 105. Additionally, the DCI 312 may indicate an UL grant for the UE 115. The UE 115 may receive the DCI 312 indicating the UL grant and desire to transmit an UL transmission via a PUSCH 322 according to the UL grant. The UL transmission via the PUSCH 322 may be scheduled after the UL transmission via the PUCCH 320.

Prior to transmitting the PUCCH 320 associated with the PDSCH 308, the UE 115 may perform an LBT 330 to reserve a TXOP 332 to transmit the feedback associated with the PDSCH 308 via the PUCCH 320. If the TXOP 304 reserved by the BS 105 and the TXOP 332 reserved by the UE 115 overlaps such that the UE 115 is able to transmit the feedback within the TXOP 304, the LBT 330 may be a category 2 LBT. In this example, the UE 115 may perform a category 2 LBT before transmitting the PUCCH 320. If the LBT 330 results in an LBT pass, the UE 115 transmits the PUCCH 320 during the TXOP 304 reserved by the BS 105. If a gap between the DL transmission via the PDSCH 308 and the UL transmission via the PUCCH 320 satisfies a predefined threshold (e.g., ten microseconds or seven symbols), the UE 115 may perform "no LBT" before transmitting the feedback via the PUCCH 320. The gap may satisfy the predefined threshold if the gap is smaller than the predefined threshold.

In another example, the UE 115 may receive the PDSCH 308, but may not have enough time to process the PDSCH 308 and transmit feedback associated with the PDSCH 308 back to the BS 105 within the TXOP 304 reserved by the BS 105. In this example, the UE 115 may transmit the feedback associated with the PDSCH 308 outside of the TXOP 304 reserved by the BS 105. Additionally, prior to transmitting the PUSCH 322 according to the UL grant indicated by the DCI 312, the UE 115 may perform an LBT 340 to reserve a TXOP 342 to transmit an UL transmission via the PUSCH 322.

For the UE 115, the UL transmission via the PUSCH 322 may be scheduled after the UL transmission via the PUCCH 320. Each of the PUCCH 320 and the PUSCH 322 may be associated with a different priority for transmission. In some examples, the UE 115 may perform the LBT 330 during a first time period 334 for transmitting the PUCCH 320 associated with a first priority. The UE 115 may perform the LBT 340 during a second time period 344 for transmitting the PUSCH 322 associated with a second priority. The LBT 330 and the LBT 340 may be category 4 LBTs. Additionally, the first priority may be different from the second priority. For example, the PUCCH 320 may have a higher priority for transmission than the PUSCH 322. Accordingly, the first time period 334 may be smaller than the second time period 344 such that the UE 115 performs the LBT for a longer time period for the lower priority transmission compared to the higher priority transmission. For example, the first time period 334 may be three, and the second time period 344 may be seven. The length of the first time period 334 and/or second time period 344 may be decided by agreement of the network. Additionally or alternatively, the length of the first time period 334 and/or second time period 344 may depend on various factors (e.g., the traffic priority).

The first time period 334 may at least partially overlap with the second time period 344. By overlapping the first time period 334 with the second time period 344 for performing the LBT 330 and the LBT 340, the time consumed for performing LBTs may be reduced. For example, if the first time period 334 is three ms and the second time period 344 is seven ms, rather than performing the LBT 330 for three ms for the UL transmission via the PUCCH 320 and subsequently performing the LBT 340 for seven ms for the UL transmission via the PUSCH 322 (resulting in a ten ms LBT time duration), the first time period 334 during which the UE 115 performs the LBT 330 may overlap with second time period 344 during which the UE 115 performs the LBT 340 (resulting in a seven ms LBT time duration). Accordingly, rather than consuming ten ms, both LBTs 330 and 340 may be performed in seven ms.

Additionally, the first and the second time periods may end at the same time. In an example, the UE 115 may subtract the first time period 334 from the second time period 344 to determine a time difference. The UE 115 may start counting down the second time period 344 and then start counting down the first time period 334 when the time difference has elapsed within the second time period 344. For example, the UE 115 may start "counting down" the second time period 344, which may be seven ms, and start "counting down" the first time period 334 after four ms has elapsed within the second time period 344. Accordingly, the first and the second time periods 334 and 344 will end at the same time.

The UE 115 transmits at least one of the PUCCH 320 or the PUSCH 322 based on at least one of the LBT 330 or the LBT 340. In the example illustrated in FIG. 3, if the LBT 340 results in an LBT pass and the LBT 330 results in an LBT pass, the UE 115 may transmit the PUCCH 320 followed by the PUSCH 322. Doing so may improve spectrum sharing performance and reduce LBT latency.

Figure 4:
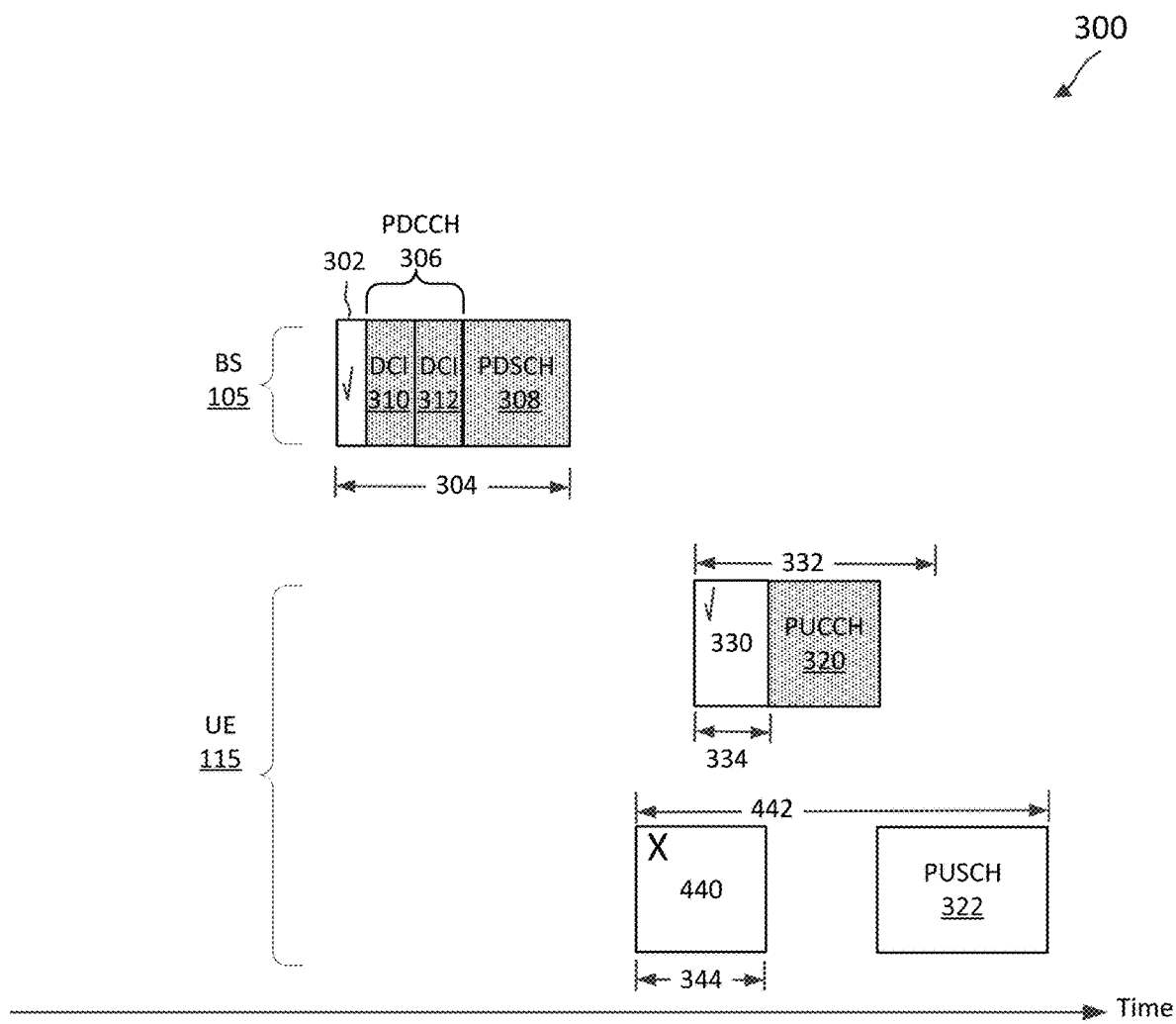
FIG. 4 illustrates a communication scheme for transmitting one or more communication signals based on two LBTs according to some embodiments of the present disclosure.

FIG. 4 illustrates a communication scheme 400 for transmitting one or more communication signals based on performing two LBTs according to some embodiments of the present disclosure. The communication scheme 400 may be employed by UEs such as the UEs 115 and by BSs such as BSs 105 in a network such as the network 100. Aspects of FIG. 3 may correspond to aspects of FIG. 4. For example, the BS 105 may transmit during TXOP 304, the PDCCH 306 and the PDSCH 308 to the UE 115. The UE 115 may receive the PDCCH 306 and the PDSCH 308 from the BS 105 and desire to transmit the PUCCH 320 and the PUSCH 322.

In FIG. 4, the UE 115 may perform an LBT 440 to reserve a TXOP 442 for a DL transmission in the PUSCH 322. The UE 115 may perform the LBT 440 during the second time period 344 for transmitting the PUSCH 322 associated with a second priority. In keeping with the example above regarding the first time period 334 being three ms and the second time period 344 being seven ms, the UE 115 may perform the LBT 330 after four ms has elapsed within the second time period 344. In this example, the UE 115 may perform the LBT 330 during the first time period 334 for transmitting the PUCCH 320 associated with a first priority different from the second priority.

The checkmark shown in the LBT 330 indicates that the LBT 330 results in an LBT pass, and the "X" shown in the LBT 440 indicates that the LBT 440 results in an LBT fail. If the LBT 440 associated with the lower priority transmission fails, but the LBT 330 associated with the higher priority transmission passes, the UE 115 may transmit the PUCCH 320 (but not the PUSCH 322).

Figure 5:
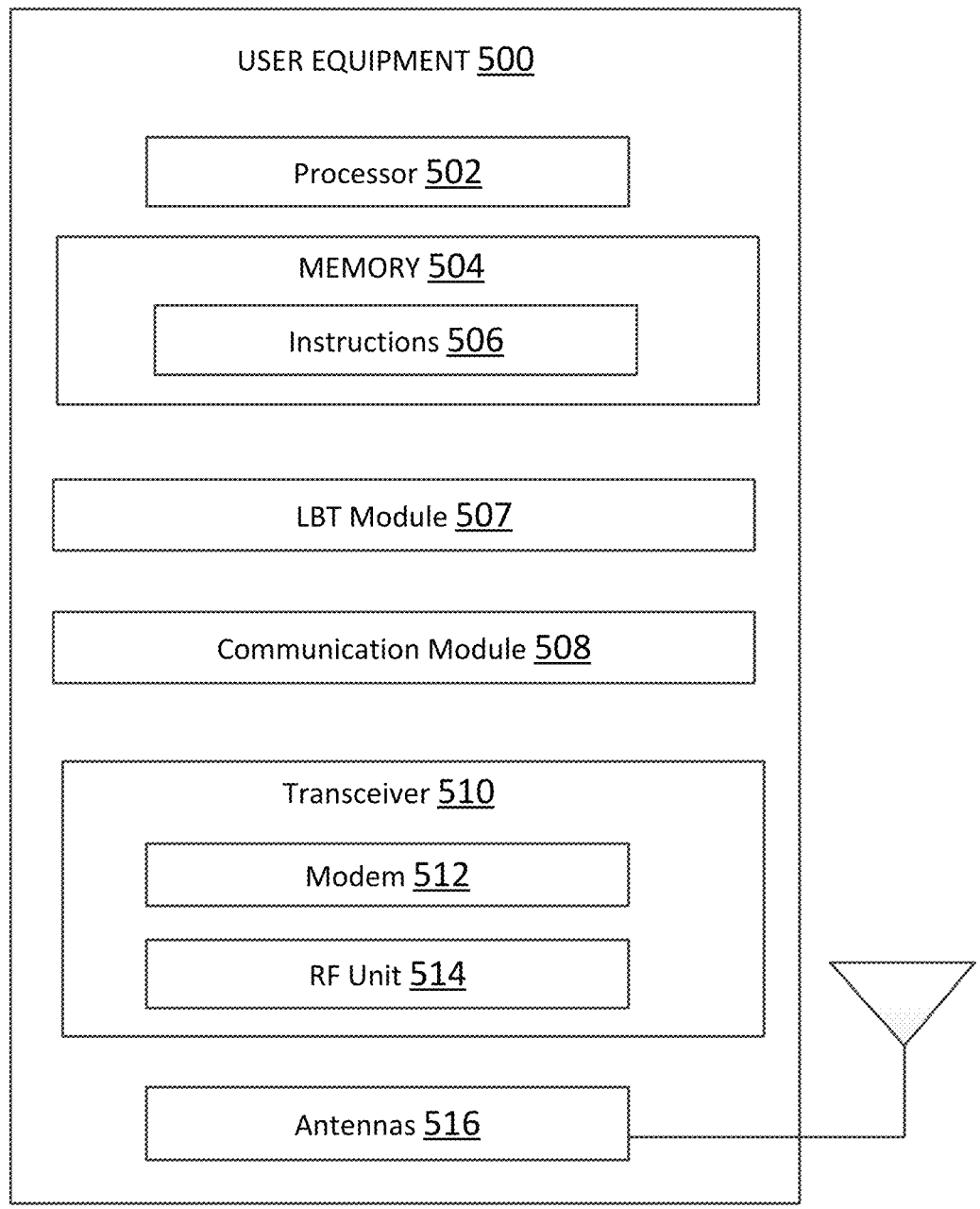
FIG. 5 is a block diagram of an example user equipment (UE) according to embodiments of the present disclosure.

FIG. 5 is a block diagram of an example UE 500 according to embodiments of the present disclosure. The UE 500 may be a UE 115 as discussed above. As shown, the UE 500 may include a processor 502, a memory 504, an LBT module 507, a communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure. The instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the LBT module 507 and the communication module 508 may be implemented via hardware, software, or combinations thereof. For example, each of the LBT module 507 and the communication module 508 may be implemented as a processor, circuit, and/or instructions 506 stored in the memory 504 and executed by the processor 502. Each of the LBT module 507 and the communication module 508 may be used for various aspects of the present disclosure.

The LBT module 507 may be configured to perform a first LBT during a first time period for transmitting a first communication signal associated with a first priority. The LBT module 507 may also be configured to perform a second LBT during a second time period for transmitting a second communication signal associated with a second priority, where the first time period is at least partially overlapping with the second time period, and where the first priority is different from the second priority.

The communication module 508 may be configured to transmit at least one of the first communication signal or the second communication signal based on at least one of the first LBT or the second LBT. In an example, the communication module 508 may transmit the first and second communication signals to the BS if the second LBT results in a LBT pass. The communication module 508 may transmit the first communication signal to the BS if the first LBT results in a LBT pass. The communication module 508 does not transmit the second communication signal if the second LBT results in a LBT fail. In this example, the LBT module 507 may perform a third LBT for transmitting the second communication signal. If the third LBT results in a LBT pass, the communication module 508 may transmit the second communication signal to the BS.

As shown, the transceiver 510 may include the modem subsystem 512 and the RF unit 514. The transceiver 510 can be configured to communicate bi-directionally with other devices, such as the BSs 105 and/or another core network element. The modem subsystem 512 may be configured to modulate and/or encode the data from the memory 504, the LBT module 507, and/or the communication module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
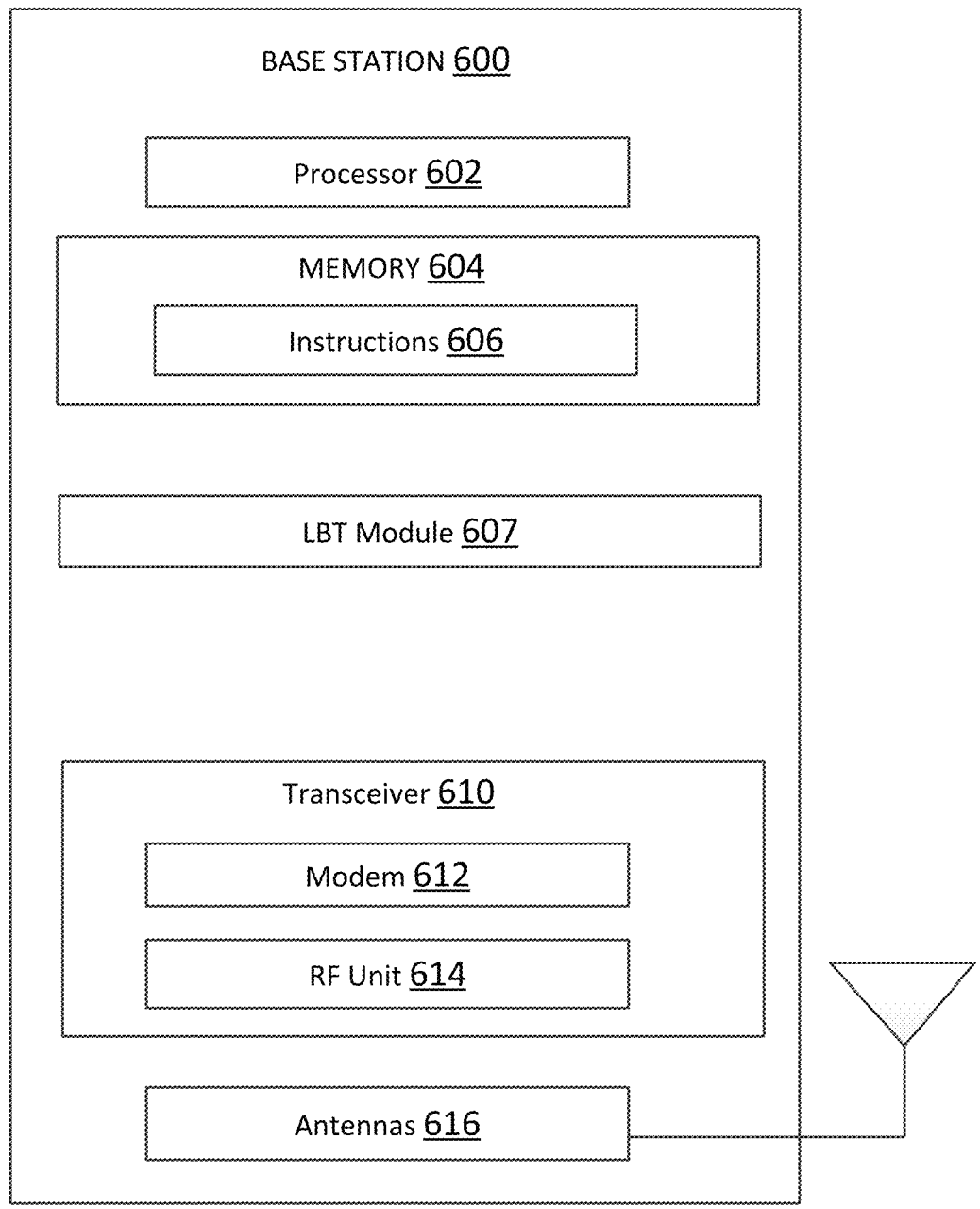
FIG. 6 is a block diagram of an example base station (BS) according to embodiments of the present disclosure.

FIG. 6 is a block diagram of an example BS 600 according to embodiments of the present disclosure. The BS 600 may be a BS 105 as discussed above. As shown, the BS 600 may include a processor 602, a memory 604, an LBT module 607, a communication module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. The instructions 606 may also be referred to as code, which may be interpreted broadly to include any type of computer-readable statement(s) as discussed above with respect to FIG. 5.

Each of the LBT module 607 and the communication module 608 may be implemented via hardware, software, or combinations thereof. For example, each of the LBT module 607 and the communication module 608 may be implemented as a processor, circuit, and/or instructions 606 stored in the memory 604 and executed by the processor 602. Each of the LBT module 607 and the communication module 608 may be used for various aspects of the present disclosure.

The LBT module 607 may be configured to perform LBT in a shared medium. Additionally, the communication module 608 may be configured to transmit PDCCH indicating an UL grant and/or a DL grant and may also be configured to transmit PDSCH. The LBT module 607 may perform a LBT (e.g., category 4 LBT, category 2 LBT, or "no LBT") and reserve a TXOP or COT (e.g., TXOP 202) and schedule PDSCH, PUSCH, and/or PUCCH within the TXOP.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or another BS. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 600 to enable the BS 600 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
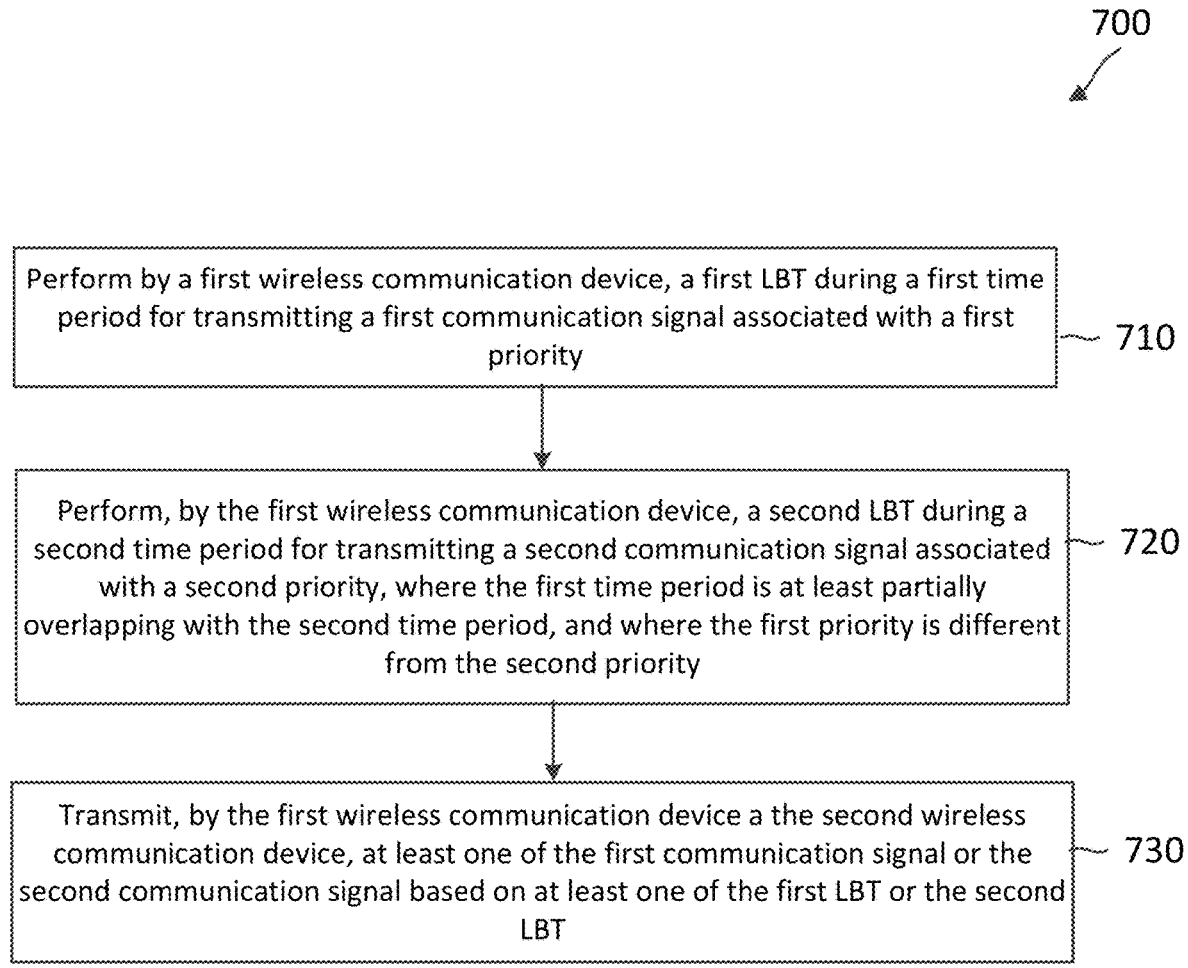
FIG. 7 is a flow diagram of a method for transmitting one or more communication signals based on performing two LBTs according to some embodiments of the present disclosure.

FIG. 7 is a flow diagram of a method 700 for transmitting one or more communication signals based on performing two LBTs according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or UE 500, may utilize one or more components, such as the processor 502, the memory 504, the LBT module 507, the communication module 508, the transceiver 510, the modem 512, and/or the one or more antennas 516, to execute the steps of method 700. The method 700 may employ similar mechanisms as in the communication schemes 200, 300, and 400 as described with respect to FIGS. 2, 3, and 4, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes performing, by a first wireless communication device, a first LBT during a first time period for transmitting a first communication signal associated with a first priority. In an example, the first communication signal is transmitted in a control channel (e.g., PUCCH), and the first wireless communication device may be a UE.

At step 720, the method 700 includes performing, by the first wireless communication device, a second LBT during a second time period for transmitting a second communication signal associated with a second priority, where the first time period is at least partially overlapping with the second time period, and where the first priority is different from the second priority. In an example, the second communication signal is transmitted in a data channel (e.g., PUSCH). Additionally, the first priority may be higher than the second priority. In this example, the second time period associated with the second priority may be longer than the first time period associated with the first priority. The first wireless communication may "count down" both the first and second time periods such that they end at the same time.

At step 730, the method 700 includes transmitting, by the first wireless communication device with a second wireless communication device, at least one of the first communication signal or the second communication signal based on at least one of the first LBT or the second LBT. The first wireless communication device may be a UE, and the second wireless communication device may be a BS. The first wireless communication device may transmit the first communication signal via the PUCCH and may transmit the second communication signal via the PUSCH.

In an example, if both the first and second LBTs pass, the first wireless communication device may transmit the first communication signal and the second communication signal to the BS. In another example, if the first LBT passes and the second LBT fails, the first wireless communication device may transmit the first communication signal, but not the second communication signal, to the BS. If the second LBT fails, the first wireless communication device may perform a third LBT for transmitting the second communication signal. If the third LBT results in a LBT pass, the first wireless communication device may transmit the second communication signal to the BS.

Figure 8:
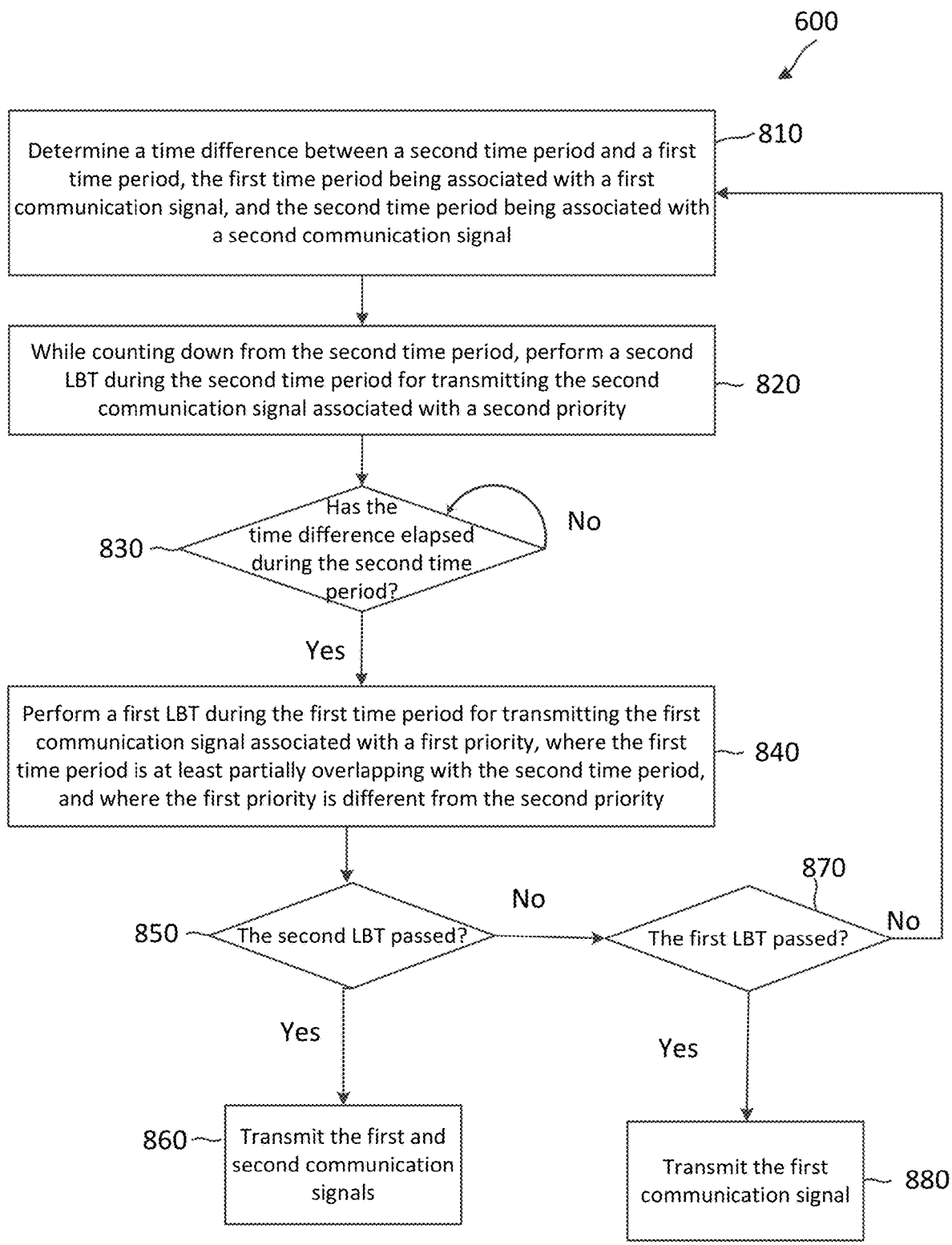
FIG. 8 is a flow diagram of a method for transmitting one or more communication signals based on performing two LBTs according to some embodiments of the present disclosure

FIG. 8 is a flow diagram of a method 800 for transmitting one or more communication signals based on performing two LBTs according to some embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UE 115 or UE 500, may utilize one or more components, such as the processor 502, the memory 504, the LBT module 507, the communication module 508, the transceiver 510, the modem 512, and/or the one or more antennas 516, to execute the steps of method 800. The method 800 may employ similar mechanisms as in the communication schemes 200, 300, and 400 as described with respect to FIGS. 2, 3, and 4, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes determining a time difference between a second time period and a first time period, the first time period being associated with a first communication signal, and the second time period being associated with a second communication signal. In an example, the first communication signal is PUCCH and the second communication signal is PUSCH.

At step 820, the method 800 includes while counting down from the second time period, performing a second LBT during the second time period for transmitting the second communication signal associated with a second priority. At step 830, the method 800 includes determining whether the time difference elapsed during the second time period.

At step 840, the method 800 includes performing a first LBT during the first time period for transmitting the first communication signal associated with a first priority, where the first time period is at least partially overlapping with the second time period, and where the first priority is different from the second priority. In an example, the first communication signal has a higher priority than the second communication signal. In this example, the second time period during which the second LBT is performed is of a longer duration than the first time period during which the first LBT is performed. By performing the first LBT at the time difference, the first and second time periods may end at the same time. In an example, if the first priority is higher than the second priority, the first time period is shorter than the second time period. If the first priority is lower than the second priority, the first time period is longer than the second time period.

At step 850, the method 800 includes determining whether the second LBT has passed. At step 860, the method 800 includes if the second LBT has passed, transmitting the first and the second communication signals. At step 870, the method 800 includes if the second LBT has not passed, determining whether the first LBT has passed. At step 880, the method 800 includes if the first LBT has passed, transmitting the first communication signal.

After step 880, the UE may perform a third LBT for transmitting the second communication signal (not shown). If the third LBT results in a LBT pass, the UE may transmit the second communication signal to the BS.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   performing, by a first wireless communication device, a first listen-before-talk (LBT) during a first time period for transmitting a first communication signal associated with a first priority;
   performing, by the first wireless communication device, a second LBT during a second time period for transmitting a second communication signal associated with a second priority, wherein the first time period is at least partially overlapping with the second time period, wherein the first communication signal is different from the second communication signal, and wherein the first priority is different from the second priority; and
   transmitting, by the first wireless communication device to a second wireless communication device, at least one of the first communication signal or the second communication signal based on at least one of the first LBT or the second LBT.

2. The method of claim 1, wherein transmitting the first communication signal includes transmitting the first communication signal via a physical uplink control channel (PUCCH).

3. The method of claim 1, wherein transmitting the second communication signal includes transmitting the second communication signal via a physical uplink shared channel (PUSCH).

4. The method of claim 1, wherein the first priority is higher than the second priority.

5. The method of claim 4, wherein the second time period is longer than the first time period.

6. The method of claim 1, wherein transmitting at least one of the first communication signal or the second communication signal includes transmitting the first and second communication signals if the second LBT results in a LBT pass.

7. The method of claim 1, wherein transmitting at least one of the first communication signal or the second communication signal includes transmitting the first communication signal if the first LBT results in a LBT pass.

8. The method of claim 1, wherein the second communication signal is not transmitted based on the second LBT if the second LBT results in a LBT fail.

9. The method of claim 8, further comprising:
   performing, by the first wireless communication device, a third LBT for transmitting the second communication signal, wherein the second LBT results in the LBT fail, wherein transmitting at least one of the first communication signal or the second communication signal includes transmitting the second communication signal if the third LBT results in a LBT pass.

10. The method of claim 1, further comprising:
determining a time difference between the second and first time periods,
wherein performing the second LBT includes performing the second LBT during the second time period, while counting down from the second time period, and
wherein performing the first LBT includes performing the first LBT when the time difference has elapsed during the second time period.

11. The method of claim 10, wherein transmitting at least one of the first communication signal or the second communication signal includes transmitting the first and second communication signals if the second LBT results in a LBT pass.

12. The method of claim 10, wherein transmitting at least one of the first communication signal or the second communication signal includes transmitting the first communication signal if the first LBT results in a LBT pass.

13. The method of claim 1, wherein the first wireless communication device is a user equipment (UE), and the second wireless communication device is a base station (BS).

14. An apparatus comprising:
a processor configured to:
perform a first listen-before-talk (LBT) during a first time period for transmitting a first communication signal associated with a first priority; and
perform a second LBT during a second time period for transmitting a second communication signal associated with a second priority, wherein the first time period is at least partially overlapping with the second time period, wherein the first communication signal is different from the second communication signal, and wherein the first priority is different from the second priority; and
a transceiver configured to transmit to a second wireless communication device, at least one of the first communication signal or the second communication signal based on at least one of the first LBT or the second LBT.

15. The apparatus of claim 14, wherein if the first priority is higher than the second priority, the first time period is shorter than the second time period.

16. The apparatus of claim 14, wherein if the first priority is lower than the second priority, the first time period is longer than the second time period.

17. The apparatus of claim 14, wherein the transceiver transmits the first communication signal via a physical uplink control channel (PUCCH).

18. The apparatus of claim 14, wherein the transceiver transmits the second communication signal via a physical uplink shared channel (PUSCH).

19. The apparatus of claim 14, wherein the transceiver transmits the first and second communication signals if the second LBT results in a LBT pass.

20. The apparatus of claim 14, wherein the transceiver transmits the first communication signal if the first LBT results in a LBT pass.

21. The apparatus of claim 20, wherein the transceiver does not transmit the second communication signal based on the second LBT if the second LBT results in a LBT fail.

22. A non-transitory computer-readable medium having program code recorded thereon, the program code comprising:
code for causing a first wireless communication device to perform a first listen-before-talk (LBT) during a first time period for transmitting a first communication signal associated with a first priority;
code for causing the first wireless communication device to perform a second LBT during a second time period for transmitting a second communication signal associated with a second priority, wherein the first time period is at least partially overlapping with the second time period, wherein the first communication signal is different from the second communication signal, and wherein the first priority is different from the second priority; and
code for causing the first wireless communication device to transmit to a second wireless communication device, at least one of the first communication signal or the second communication signal based on at least one of the first LBT or the second LBT.

23. The non-transitory computer-readable medium of claim 22, wherein the code for causing the first wireless communication device to transmit at least one of the first communication signal or the second communication signal includes code for causing the first wireless communication device to transmit the first communication signal via a physical uplink control channel (PUCCH).

24. The non-transitory computer-readable medium of claim 22, wherein the code for causing the first wireless communication device to transmit at least one of the first communication signal or the second communication signal includes code for causing the first wireless communication device to transmit the second communication signal via a physical uplink shared channel (PUSCH).

25. The non-transitory computer-readable medium of claim 22, wherein the first priority is higher than the second priority.

26. The non-transitory computer-readable medium of claim 25, wherein the first time period is longer than the second time period.

27. The non-transitory computer-readable medium of claim 22, wherein the code for causing the first wireless communication device to transmit at least one of the first communication signal or the second communication signal includes code for causing the first wireless communication device to transmit the first and second communication signals if the second LBT results in a LBT pass.

28. The non-transitory computer-readable medium of claim 22, wherein the code for causing the first wireless communication device to transmit at least one of the first communication signal or the second communication signal includes code for causing the first wireless communication device to transmit the first communication signal if the first LBT results in a LBT pass.

29. The non-transitory computer-readable medium of claim 22, wherein the second communication signal is not transmitted based on the second LBT if the second LBT results in a LBT fail.

30. The non-transitory computer-readable medium of claim 22, further comprising:
code for causing the first wireless communication device to determine a time difference between the second and first time periods, wherein the code for causing the first wireless communication device to perform the second LBT includes code for causing the first wireless communication device to perform the second LBT during the second time period, while counting down from the second time period, and wherein the code for causing the first wireless communication device to perform the first LBT includes code for causing the first wireless communication device to perform the first LBT when the time difference has elapsed during the second time period.

* * * * *